UNITED STATES PATENT OFFICE.

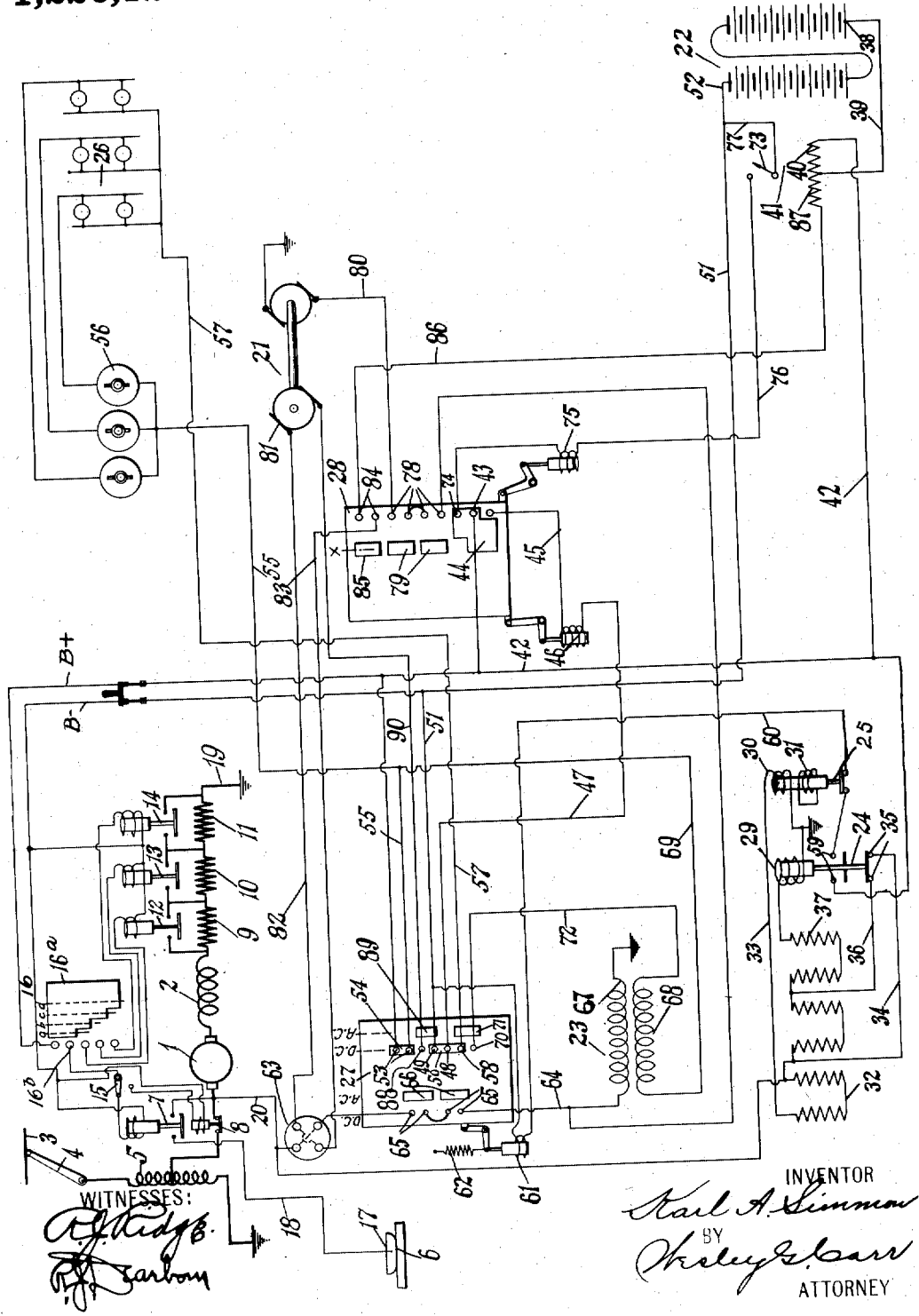

KARL A. SIMMON, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL FOR ELECTRIC RAILWAYS.

1,226,126.  Specification of Letters Patent.  Patented May 15, 1917.

Application filed September 28, 1912. Serial No. 722,937.

*To all whom it may concern:*

Be it known that I, KARL A. SIMMON, a citizen of the United States, and a resident of Wilkinsburg, in the county of Allegheny and State of Pennsylvania, have invented a new and useful Improvement in Systems of Distribution and Control for Electric Railways, of which the following is a specification.

My invention relates to systems of electric current distribution and control, and it has special reference to such systems as are supplied with energy from either an alternating-current or a direct current source.

One of the objects of my invention is to provide automatic means for so adjusting the circuits of a system of the class above indicated as to maintain a substantially continuous supply of energy of a suitable voltage to a lighting or other distributing circuit.

A second object of my invention is to provide an auxiliary source of energy and automatic means for connecting the distributing circuit either to said auxiliary source or to a derived circuit of the main source, according to the character of the energy supplied to the system as a whole.

When electrically propelled cars or locomotives are adapted to operate over one section of track which is supplied with energy from an alternating-current source and over another section of track which is supplied with energy from a direct-current source, it is particularly difficult, although highly desirable, to continuously maintain a suitable voltage on the lighting circuits, irrespective of the character of the energy supplied to the vehicle.

According to my present invention, I accomplish the aforesaid objective results by providing a transformer which is adapted to supply the lighting circuits with alternating-current energy of the proper voltage when the vehicle is operating over an alternating current section of the line and a storage battery or other suitable auxiliary source of energy from which energy is supplied to the lighting circuit at the proper voltage when the vehicle is operating on a direct-current section of the line and automatic means for arranging the circuits to change over from one source to the other.

The single figure of the accompanying drawing is a diagrammatic view of a system of distribution and control embodying my invention.

Referring to the drawing, electric energy may be supplied to an electric motor having an armature 1 and a field magnet winding 2, either from an alternating-current supply line conductor 3, through a trolley 4 and a transformer 5, or from a third rail or other suitable conductor 6 supplied with direct-current energy.

The circuit connections for the motor are selectively governed by a pair of line switches 7 and 8, and acceleration of the motor is controlled by resistor sections 9, 10 and 11 and mechanically independent switches 12, 13 and 14. The switches 7, 8, 12, 13 and 14 are electro-magnetically operated and are governed by a change-over switch 15 and a master switch 16 which comprises a movable drum $16^a$ and a set of stationary contact terminals $16^b$.

If the change-over switch 15 occupies the position in which it is illustrated, the coil of the switch 7 is energized as soon as the master switch 16 is moved into position $a$, inasmuch as said coil is then connected across the terminals of a storage battery 22 through conductors B+ and B—. A main circuit is thus established from the third rail 6, through a shoe 17, a conductor 18, the switch 7, the motor armature 1, the field magnet winding 2 and the resistor sections 9, 10 and 11, to an opposite line conductor 19. Energy is also supplied to a train line conductor 20.

As the master switch 16 successively occupies positions $b$, $c$ and $d$, the resistor sections 9, 10 and 11 are progressively short circuited and the motor is accelerated in a well known manner.

This portion of the system forms no part of my present invention and is intended to be representative of the main driving motors and control circuits of a railway vehicle.

The system of distribution further comprises a motor-generator 21, a storage battery 22, an auxiliary transformer 23, a pair of relay switches 24 and 25, a plurality of electric lamps 26 or other translating devices, a lighting change-over switch 27 and a battery-charging switch 28.

The relay switch 24 is provided with a coil 29 and the relay switch 25 is provided with an actuating coil 30 and a short-circuited coil 31.

When energy is supplied to the train line conductor 20, the circuit is completed therefrom through a resistor 32, a conductor 33 and the coil 30 of the relay switch 25 to ground.

Another circuit is established through a conductor 34, a pair of contact members 35, which are bridged when the relay switch 24 is deënergized, a conductor 36, a resistor 37, and the coil 29 of the relay switch 24 to the opposite line conductor or to ground.

Whenever direct-current or alternating-current energy is supplied to the conductor 20, the coil 29 will be so energized as to raise the relay switch 24, but the relay switch 25 will be opened only when direct-current energy is supplied to the conductor 20, on account of the short-circuited coil 31 which entirely counteracts the effect of the alternating current which is supplied to the coil 30 when the conductor 20 is connected to the alternating current source. Thus, when the vehicle is connected to the alternating-current conductor 3, only the relay switch 24 will be raised, but, when the vehicle is supplied with energy from the direct-current third rail conductor 6, both of the relay switches 24 and 25 will be raised.

When the main circuit is interrupted by the line switches 7 and 8 and the train line conductor 20 is dead, the relay switches will occupy the positions in which they are illustrated. Under these conditions, a circuit will be established from a positive terminal 38 of the storage battery 22, through a conductor 39, a coil section 40 of an ampere hour meter and a conductor 42, to a contact finger 43. From this point, the circuit is continued, provided the battery-charging switch 28 occupies its charging position $x$, through a contact member 44, a conductor 45, a coil 46, a conductor 47, contact fingers 48 and 49, which are bridged by a contact member 50 when the lighting change-over switch 27 occupies its D—C position, as shown in the diagram, and a conductor 51 to the opposite terminal 52 of the battery.

The coil 46, when energized, moves the battery-charging switch to its discharge position. If the switch already occupies this position, as shown in the drawings, the circuit above traced through the coil 46, is incomplete, but a circuit is completed from conductor 42, through contact fingers 53, which are bridged by a contact member 54 of the change-over switch, conductor 55, as many of the snap switches 56 as are closed, and a corresponding number of groups of the lamps 26 to a conductor 57, circuit being completed through a finger 58 and the contact member 50 of the change-over switch to the battery conductor 51. Thus, the lamps are supplied with energy from the storage battery directly, the transformer 23 and the motor generator 21 being both disconnected from the remainder of the system.

The conditions just described are such as obtain when the vehicle is coasting over a section break or when the main supply circuit is interrupted.

If it is now assumed that the vehicle is receiving energy from the third-rail conductor 6, the change-over switch 15 occupying the position shown in the drawing and direct-current energy being supplied to the train line conductor 20, the relay switches 24 and 25 are both raised, as above indicated. The action of the switch 25 is, however, retarded by the short-circuited coil 31.

It is evident that, under these conditions, the elements of the control apparatus occupy the same positions which they occupy when no energy is supplied to the train-line conductor 20 and, accordingly, the battery 22 is still relied upon to supply energy to the lighting circuit.

If it is assumed that the change-over switch 15 is moved to occupy its A—C position, the switch 8 will be closed and energy will be supplied from the alternating-current supply conductor 3, through the trolley 4, and the switch 8 to the train line conductor 20. Under these conditions, the short-circuited coil 31 prevents the relay switch 25 from being opened and, consequently, only the relay switch 24 is actuated, as above indicated.

When the relays occupy these positions, a battery circuit is established from the conductor 42, through a pair of contact members 59 of the switch 24, the switch 25, a conductor 60, a coil 61 of the change-over switch 27 and the conductor 51 to the battery terminal 52. The coil 61, when energized, acts in opposition to a spring 62 and throws the change-over switch 27 into its A—C position.

A circuit is now established from the train line conductor 20, through a plug switch 63, a conductor 64, a pair of contact fingers 65, which are bridged by contact members 66, to a primary winding 67 of the transformer 23, the opposite terminal of which is grounded.

The secondary winding 68 of the transformer 23 is now utilized for supplying energy to the lighting circuit, connections being established from one terminal of the winding through a conductor 69, the conductor 55, the switches 56, the lamps 26, the conductor 57, the contact fingers 58 and 70, which are bridged by a contact member 71, and a conductor 72 to the opposite terminal of the winding.

If, under these conditions, the storage battery 22 becomes discharged to a predetermined degree, a contact pointer 73 of the ampere hour meter 41 will complete a circuit from the conductor 42, through the contact fingers 43 and 74, which are bridged by the contact member 44, a coil 75, a conductor 76, the contact pointer 73, and a conductor 77 to the opposite battery terminal 52.

The coil 75, when thus energized, throws the battery-charging switch to position $x$, thereby interrupting the circuit of the coil 75 and completing a circuit from the conductor 64, through a pair of contact fingers 78, which are now bridged by a contact member 79, a conductor 80 and the motor armature of the motor-generator 21 to ground.

The motor generator will thus be operated and will generate direct-current energy, which is delivered from a terminal 81 through a conductor 82, the plug 63, a conductor 83, a pair of contact fingers 84, which are bridged by the contact member 85, a conductor 86, a coil section 87 of the ampere hour meter and the conductor 39 to the positive terminal of the storage battery, circuit being completed from the negative terminal of the battery through the conductor 51, the contact fingers 49 and 88, which are bridged by a contact member 89, and a conductor 90, to the opposite generator terminal of the motor-generator 21. Under these conditions, therefore, the battery is charging.

It is thus evident that the system is adapted to supply suitable energy to the lighting circuit whether alternating current or direct current is supplied to the train line conductor or whether the conductor is dead and receives no energy at all.

Switches having the operating characteristics of the relay switch 25 may be utilized in other relations, as, for example, in a unit switch controller for direct-current operation, the short-circuited coil being relied upon to produce the necessary delay in the action of the successive switches. The system of my invention is particularly well adapted for use on trail cars which are coupled to and are hauled by a motor car. The arrangement and circuit connections of the system may be varied within the spirit and scope of my invention.

I claim as my invention:

1. An alternating direct-current system of distribution, comprising a change-over switch and a relay switch for governing the position of the change-over switch, said relay switch being provided with an actuating coil and with a neutralizing coil which is effective in neutralizing the actuating coil only on alternating current.

2. A system of distribution comprising a supply circuit, an alternating-current and a direct-current source adapted to be connected to said supply circuit, translating means, a transformer, an auxiliary source of direct-current energy and a change-over switch adapted to connect the translating means either to the transformer or to the auxiliary source of direct-current energy, according as the supply circuit is charged with alternating or direct-current energy.

3. A system of distribution comprising a supply circuit, an alternating and a direct-current source adapted to be connected to said supply circuit, a distributing circuit, an auxiliary source of direct current and means for supplying energy to the distributing circuit either from the auxiliary source of direct current or from the supply circuit, according as the supply circuit conductor is charged with direct current or alternating-current energy.

4. A system of distribution comprising a supply circuit, an alternating-current and a direct-current source adapted to be connected to said supply circuit, a distributing circuit, an auxiliary source of direct-current energy, a transformer and automatic means for supplying energy to said distributing circuit either from the auxiliary source of direct current or from the transformer, according as the supply circuit is charged with direct-current or alternating-current energy.

5. A system of distribution comprising a supply circuit, a direct-current and an alternating-current source adapted to be connected to said supply circuit, a distributing circuit, a storage battery, a transformer and means for energizing the transformer from the supply circuit and supplying energy from the transformer to the distributing circuit when the supply circuit is connected to the alternating-current source and connecting the storage battery to the distributing circuit when the supply circuit is connected to the direct-current source.

6. A system of distribution comprising a supply circuit adapted to receive energy from either a direct-current or an alternating-current source, a distributing circuit, a storage battery, a transformer, a pair of governing relay switches, one of which is actuated irrespective of the kind of current traversing the supply circuit and the other of which is provided with a short-circuited coil and is inactive when alternating current traverses the supply circuit.

7. A system of distribution comprising a supply circuit adapted to receive energy from either a direct-current or an alternating-current source, a distributing circuit, a transformer and a storage battery, of a switching device and a plurality of relays only one of which is adapted to be energized by alternating-current energy for causing said switching device to connect said distributing circuit to said transformer when alternating-current is delivered to the supply circuit and to connect said distributing circuit to said storage battery when direct-current energy is furnished to the supply circuit.

8. An alternating-direct-current system of distribution comprising means for supplying either direct-current energy or alternating-current energy thereto, a change-over switch biased to a predetermined position, electrically controlled means for actuating said change-over switch and a plurality of relays acting in conjunction to cause said electrically controlled means to effect the actuation of said change-over switch when the energy of the system is of a predetermined character.

9. The combination with a supply circuit adapted to receive either direct-current or alternating-current energy, an electrically controlled switching device, and a pair of relays for governing the action of said switching device in accordance with the character of the energy supplied to the system, both of said relays being actuated by direct-current energy and only one of them actuated by alternating-current energy.

10. The combination with a supply circuit adapted to receive either direct-current energy or alternating-current energy, translating means, a transformer and an auxiliary source of direct-current energy, of an electrically controlled change-over switch for normally establishing a circuit from the auxiliary source of direct current through the translating means when no energy is delivered to the supply circuit and a plurality of relays responsive to the energy of said supply circuit and acting in conjunction to cause said change-over switch to connect the translating means to said transformer only when alternating current is delivered to the supply circuit.

11. In a system of distribution, the combination with a supply circuit adapted to receive either direct-current energy or alternating-current energy, translating means, a transformer and a storage battery, of a change-over switch for connecting said translating means to said transformer or said storage battery in accordance with the character of energy of the supply circuit and means for automatically charging said storage battery under predetermined conditions thereof.

12. In a system of distribution, the combination with a supply circuit adapted to receive either alternating-current energy or direct-current energy, a distributing circuit, a transformer and a storage battery, an automatic means dependent upon the character of energy of said supply circuit for connecting said distributing circuit to said transformer or to said storage battery, a motor-generator set, and automatic means for connecting the generator of said set to said storage battery for charging purposes under predetermined conditions thereof and when the distributing circuit is supplied with energy from said transformer.

13. The combination with a supply circuit, means for connecting said circuit to a source of direct-current energy or a source of alternating-current energy, a distributing circuit, a transformer, a storage battery and a change-over switch normally adapted to connect said distributing circuit to said storage battery, of automatic means for actuating said change-over switch to connect said distributing circuit to said transformer only when alternating-current energy is delivered to said supply circuit, a motor-generator charging set, a charging switch and automatic means dependent upon the condition of charge of said battery for actuating said charging switch to connect the generator of said charging set to said battery.

14. A system of distribution comprising a supply circuit adapted to receive either direct-current energy or alternating-current energy, a distributing circuit, an auxiliary source of direct-current energy, a transformer, a set of relay switches adapted to be actuated by direct-current energy, but only one of which is adapted to be actuated by alternating-current energy, and means coöperating therewith for connecting said distributing circuit to said transformer or to said auxiliary source of direct-current energy in accordance with the character of the energy of said supply circuit.

15. A system of distribution comprising a supply circuit adapted to receive energy either from a direct-current or an alternating-current source, a distributing circuit, a transformer, and electrically controlled means including a pair of relay switches for connecting said distributing circuit to said storage battery or to said transformer according as the energy of the supply circuit is direct or alternating in character, both of said relay switches being actuated by direct-current energy and only one of which is actuated by alternating-current energy.

16. A system of distribution comprising a supply circuit adapted to receive energy from either a direct-current or alternating-current source, an electrically controlled switching device and a plurality of relay switches adapted to be energized from said source irrespective of the character of energy thereof for governing the actuation of said electrically controlled switching device, one of said relay switches being inoperative when supplied with alternating-current energy.

In testimony whereof, I have hereunto subscribed by name this 21st day of Sept., 1912.

KARL A. SIMMON.

Witnesses:
W. B. CARPENTER,
B. B. HINES.